Patented Oct. 4, 1932

1,880,645

UNITED STATES PATENT OFFICE

OTTO WULFF, OF HOFHEIM-IN-TAUNUS, GERMANY, ASSIGNOR TO I. G. FARBEN-INDUSTRIE AKTIENGESELLSCHAFT, OF FRANKFORT-ON-THE-MAIN, GERMANY

β-HYDROXY-DERIVATIVES OF ALKYL-PYRIDINES AND PROCESS OF PREPARING THEM

No Drawing. Application filed November 6, 1929, Serial No. 405,289, and in Germany November 26, 1928.

The present invention relates to β-hydroxy-derivatives of alkyl-pyridines and to a process of preparing them.

I have found that the β-hydroxy-derivatives of alkyl-pyridines can be prepared from the corresponding sulphonic acids by fusing them together with caustic alkalies.

For this purpose the alkali salts of alkyl-pyridine-β-sulphonic acids are heated for 10–30 minutes with an excess of caustic alkalies, preferably with potassium hydroxide to a temperature of between 180° C. and 250° C., preferably to about 235° C. After cooling the whole is dissolved in a small quantity of water and after neutralization of the solution thus obtained, the β-hydroxy-derivatives is isolated by filtering by suction and extracting with solvents.

The resultant β-hydroxy-derivatives of alkyl-pyridines are colorless substances which are soluble in water and alcohol.

The following examples serve to illustrate the invention, but they are not intended to limit it thereto.

1. 76 grams of potassium hydroxide and 2 cc. of water are melted in an iron-boiler and at a temperature of about 160° C. 36 grams of the finely pulverized crude potassium salt of α-picoline-sulphonic acid or of the sodium salt of α-picoline-sulphonic acid (prepared as described in my co-pending U. S. application Ser. No. 405,288 of even date for: "Process for sulphonating pyridine and its homologues") are slowly introduced while stirring. Then the temperature is slowly raised while stirring. At a temperature of 210° C. reaction occurs and the mass is spontaneously heated to about 235° C.–240° C. Then the mass is further heated for 15–20 minutes at this temperature.

After cooling the whole is taken up in as small a quantity of water as possible (about 100 cc.) and neutralized while cooling by means of 78 cc. of concentrated hydrochloric acid, so that there is no longer any alkaline reaction to phenolphthalein. The mass is allowed to stand during the night and then the separated crystals are filtered by suction, while washing only very cautiously with a small quantity of water or not at all, because the hydroxy-α-picoline thus obtained is very easily soluble in water.

One part of the hydroxy-α-picoline is contained in the separated crystals besides inorganic substances, a second part in the aqueous solution. The hydroxy-α-picoline is preferably obtained from the crystals and the solution by extracting with solvents. After evaporation of the solvent nearly colorless crystals are obtained which are purified by boiling with dry benzene, in which they are sparingly soluble also at boiling temperature, then filtered cold by suction and washed with dry benzene. By concentrating the mother lye a further small quantity of the crystallized substance is obtained and on evaporating to dryness a tough oily feebly yellowish substance is obtained which does not crystallize, but otherwise has the same properties as the crystals; it is probably a mixture of hydroxy-bases due to the other bases present in the technical α-picoline. The total yield (10 grams of crystallized hydroxy-α-picoline and 3 grams of tough oily hydroxy-bases) amounts to about 75%, calculated upon the crude sulfonate.

The β-hydroxy-α-picoline melts at 164° C.–166° C.; it sinters a little at 155° C.

The β-hydroxy-α-picoline is readily soluble in water, in α-picoline and in alcohol, from which it can be obtained in the form of very beautiful crystals. It is sparingly soluble even in boilng benzene, moderately soluble in ether, better soluble in acetic ester. When mixed with $FeCl_3$ the aqueous solution gives a reddish-brown coloration. It boils without decomposing and again solidifies on cooling to crystals. The smell is only feeble. In a solution rendered alkaline by sodium carbonate it couples well with diazotized paranitraniline with a bluish-red coloration, when treated with an acid, it turns to yellow.

2. 90 grams of potassium hydroxide and 5 cc. of water are melted in an iron-receptacle at 140° C., 80 grams of the potassium salt of γ-picoline-β-sulfonic acid are introduced and the whole is heated while stirring. With evolution of much heat the temperature rises to 210° C.–235° C., which is kept for about ¼–½ hour. The cooled melt is dissolved in a small quantity of water and the solution is neutralized by means of hydrochloric acid, the β-hydroxy-γ-picoline crystallizing out. A further portion can be obtained from the mother liquor. The yield amounts to 60–70%.

The β-hydroxy-γ-picoline melts at 118° C.–120° C. and boils at 285° C.–290° C. while slightly decomposing.

It is easily soluble in alcohol, moderately soluble in water, scarcely soluble in cold benzene, and well soluble in warm benzene.

The solution rendered alkaline by sodium carbonate couples with diazotized paranitraniline with development of a red color, on addition of acid this color turns to yellow.

3. In the same manner as indicated in Example 1, the potassium salt of α-methyl-β'-ethyl-pyridine-β-sulfonic acid (prepared as described in my co-pending U. S. application Ser. No. 405,288 of even date for: "Process for sulphonating pyridine and its homologues") is molten. The β-hydroxy-β-ethyl-α-picoline is obtained with a good yield. It melts at 170° C.–173° C. The solubility and the color produced by coupling are similar to those of the β-hydroxy-α-picoline.

In the same manner the β-sulfonic acids of other alkyl-pyridines, that is to say of such pyridines as have more alkyl-groups or higher alkyl groups, are transformed into their hydroxy-derivatives.

In the preceding examples there can be used instead of potassium hydroxide also sodium hydroxide or another caustic alkali.

I claim:

1. The process of preparing β-hydroxy-derivatives of alkyl-pyridines, which consists in heating for 10–30 minutes to about 180° C.–250° C. the alkali metal salts of the corresponding sulfonic acids with an excess of caustic alkalies while slowly beginning the heating, taking up the product after cooling in a small quantity of water, neutralizing and isolating the resultant β-hydroxy-derivative by filtering, by suction and extracting with solvents.

2. The process of preparing β-hydroxy-derivatives of alkyl-pyridines, which consists in heating for 10–30 minutes to about 180° C.–250° C. the alkali metal salts of the corresponding sulfonic acids with an excess of potassium hydroxide while slowly beginning the heating, taking up the product after cooling in a small quantity of water, neutralizing and isolating the resultant β-hydroxy-derivative by filtering, by suction and extracting with solvents.

3. The process of preparing β-hydroxy-derivatives of alkyl-pyridines, which consists in heating for 10–30 minutes to about 235° C. the alkali metal salts of the corresponding sulfonic acids with an excess of potassium hydroxide while slowly beginning the heating, taking up the product after cooling in a small quantity of water, neutralizing and isolating the resultant β-hydroxy-derivative by filtering, by suction and extracting with solvents.

4. The process of preparing substances of the following formula:

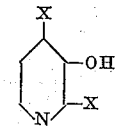

wherein the one X stands for methyl, the other X for hydrogen, which consists in heating for 10–30 minutes to about 180° C.–250° C. the alkali metal salts of the corresponding sulfonic acids with an excess of potassium hydroxide while slowly beginning the heating, taking up the product after cooling in a small quantity of water neutralizing and isolating the resultant β-hydroxy-derivative by filtering, by suction and extracting with solvents.

5. The process of preparing substances of the following formula:

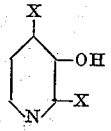

wherein the one X stands for methyl, the other X for hydrogen, which consists in heating for 10–30 minutes to about 235° C. the alkali metal salts of the corresponding sulfonic acids with an excess of potassium hydroxide while slowly beginning the heating, taking up the product after cooling in a small quantity of water, neutralizing and isolating the resultant β-hydroxy-derivative by filtering, by suction and extracting with solvents.

6. The process of preparing β-hydroxy-α-picoline, which consists in heating for 10–30 minutes to about 180° C.–250° C. the potassium salt of α-picoline-β-sulfonic acid with an excess of potassium hydroxide while slowly beginning the heating, taking up the product after cooling in a small quantity of water, neutralizing and isolating the resultant β-hydroxy-derivative by filtering, by suction and extracting with solvents.

7. The process of preparing β-hydroxy-α-picoline, which consists in heating for 10–30 minutes to about 235° C. the potassium salt of α-picoline-β-sulfonic acid with an excess of potassium hydroxide while slowly beginning the heating, taking up the product after cooling in a small quantity of water, neutralizing and isolating the resultant β-hydroxy-derivative by filtering, by suction and extracting with solvents.

8. As new products, the β-hydroxy-derivatives of alkyl-pyridines.

9. As new products, the compounds of the following formula:

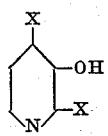

wherein the one X stands for methyl, the other X for hydrogen.

10. As a new product, the β-hydroxy-α-methylpyridine, forming colorless crystals which are easily soluble in water and alcohol, difficultly soluble in benzene.

11. As a new product, the β-hydroxy-β'-ethyl-α-methylpyridine, said product being easily soluble in water and alcohol, difficultly soluble in benzene.

In testimony whereof, I affix my signature.

OTTO WULFF.